United States Patent
Suntinger et al.

(10) Patent No.: US 8,200,682 B2
(45) Date of Patent: Jun. 12, 2012

(54) METHOD OF DETECTING A REFERENCE SEQUENCE OF EVENTS IN A SAMPLE SEQUENCE OF EVENTS

(75) Inventors: Martin Suntinger, Vienna (AT);
Hannes Obweger, Klagenfurt (AT);
Christian Rauscher, Lichtenau (AT);
Josef Schiefer, Vienna (AT)

(73) Assignee: UC4 Software GmbH, Wolfsgraben (AT)

( * ) Notice: Subject to any disclaimer, the term of this patent is extended or adjusted under 35 U.S.C. 154(b) by 574 days.

(21) Appl. No.: 12/107,462

(22) Filed: Apr. 22, 2008

(65) Prior Publication Data
US 2009/0265336 A1    Oct. 22, 2009

(51) Int. Cl.
*G06F 17/30* (2006.01)
(52) U.S. Cl. ........................................ 707/758
(58) Field of Classification Search .......... 707/749, 707/758; 714/25
See application file for complete search history.

(56) References Cited

U.S. PATENT DOCUMENTS

| | | | |
|---|---|---|---|
| 6,584,186 B1* | 6/2003 | Aravamudan et al. ... | 379/201.03 |
| 2005/0114298 A1* | 5/2005 | Fan et al. ........................... | 707/2 |
| 2006/0026130 A1* | 2/2006 | Botzer et al. ...................... | 707/3 |
| 2007/0233836 A1* | 10/2007 | Biazetti et al. ................. | 709/223 |
| 2009/0164984 A1* | 6/2009 | Woods ........................... | 717/154 |

\* cited by examiner

*Primary Examiner* — James Trujillo
*Assistant Examiner* — Amresh Singh
(74) *Attorney, Agent, or Firm* — Hoffmann & Baron, LLP (57) ABSTRACT

A method of detecting a reference sequence of events in a sample sequence of events, wherein each event is of a certain event type and holds a set of data attributes, includes the steps of: picking candidate combinations of events from said sample sequence so that the event types within each candidate combination match the event types in the reference sequence, calculating an overall similarity score for each candidate combination from at least (i) an event occurrence score based on occurrence deviations of the events of a candidate combination with respect to the matching events of the reference sequence and (ii) an attribute match score based on similarity deviations between the data attributes of the events of a candidate combination and the data attributes of the matching events of the reference sequence, and identifying the candidate combination with the best overall similarity score as reference sequence detected.

17 Claims, 8 Drawing Sheets

| Event 1 | Event 2 | Event 3 | Event 4 |
|---|---|---|---|
| Event Type: A | Event Type: A | Event Type: A | Event Type: A |
| Attributes: | Attributes: | Attributes: | Attributes: |
| A1: [ INTEGER ] 22 .... | A1: [ INTEGER ] 12 .... | A1: [ INTEGER ] 109 .... | A1: [ INTEGER ] 79 .... |

$R_{min}$ = 12
$R_{max}$ = 109

*Fig. 6*

| | Event Type: A | Event Type: A | Event Type: A | Event Type: A |
|---|---|---|---|---|
| Event sequence 1 | Attributes:<br><br>A1: [ INTEGER ]<br>22<br>.... | Attributes:<br><br>A1: [ INTEGER ]<br>12<br>.... | Attributes:<br><br>A1: [ INTEGER ]<br>109<br>.... | Attributes:<br><br>A1: [ INTEGER ]<br>79<br>.... |
| | Event Type: A | Event Type: A | Event Type: A | Event Type: A |
| Event sequence 2 | Attributes:<br><br>A1: [ INTEGER ]<br>2<br>.... | Attributes:<br><br>A1: [ INTEGER ]<br>1<br>.... | Attributes:<br><br>A1: [ INTEGER ]<br>11<br>.... | Attributes:<br><br>A1: [ INTEGER ]<br>8<br>.... |

|  | Before normalization | | | | After normalization | | | |
|---|---|---|---|---|---|---|---|---|
| Value sequence 1 | 22 | 12 | 109 | 79 | 1 | 0,54 | 4.95 | 3,59 |
| Value sequence 2 | 2 | 1 | 11 | 8 | 1 | 0,5 | 5,5 | 4 |

*Fig. 7*

|  | Before normalization | | After normalization | |
|---|---|---|---|---|
| Distance sequence 1 | 2 | 2,3 (...) | 1 | 1,15 (...) |
| Distance sequence 2 | 4 | 4,5 (...) | 1 | 1,125 (...) |

METHOD OF DETECTING A REFERENCE SEQUENCE OF EVENTS IN A SAMPLE SEQUENCE OF EVENTS

FIELD OF THE INVENTION

The present invention relates to a method of detecting a reference sequence of events in a sample sequence of events, wherein each event is of a certain event type and holds a set of data attributes.

TECHNICAL BACKGROUND

Event-based systems and particularly the concept of Complex Event Processing (CEP) have been developed and used to control business processes with loosely coupled systems. CEP enables monitoring, steering and optimizing business processes with minimal latency. It facilitates automated, near real-time closed-loop decision making at an operational level to discover exceptional situations or business opportunities. Typical application areas are financial market analysis, trading, security, fraud detection, logistics like tracking shipments, compliance checks, and customer relationship management.

In an event-based system, any notable state change in the business environment is captured in the form of an event. Events are data capsules holding data about the context of the state change in so called event attributes. Chains of semantically or temporally correlated events reflect complete business processes, sequences of customer interactions or any other sequence of related incidents.

For the analysis of historical event data, but also for an operational event-based system, one question is of particular interest: Having an event sequence on hand, which other sequences are similar to this sequence? For data analysis, answering this question helps for searching the historic data for incidents and event patterns similar to a known reference pattern. In the operational system, the discovery of similarities can be integrated into the decision processes for automated system decisions to react in near real-time to certain event pattern. In addition, it can be used for forecasting of events or process measures based on similar historic incidents.

Current approaches towards similarity searching in event sequences are limited in various ways. Time-series similarity allows for discovery of similarities in numeric value sequences. Yet, inhomogeneous event data, consisting of attributes of arbitrary data types can only partially be processed, and a discovery of matching sub-sequences is not possible. In addition, no flexibility in modelling and constraining the comparison process is given and comparison of attributes is limited.

Accordingly, there is a need to provide an improved method for detecting reference sequences in arbitrary sample sequence which allows for the processing of inhomogeneous event data, the detection of sub-sequences, and/or flexibility in modelling and constraining the detection process with consistent and reliable results.

SUMMARY OF THE INVENTION

It is an object of the invention to fulfill these and other needs, to overcome problems associated with the prior art, and to provide a similarity comparison model which overcomes above named shortcomings and considers all relevant aspects of event sequences for the comparison process. It is a further object of the invention to propose a method that offers utmost flexibility in configuration and customization of the matching process.

To this end, the invention provides a method of detecting a reference sequence of events in a sample sequence of events, wherein each event is of a certain event type and holds a set of data attributes, comprising the steps of:

(a) picking candidate combinations of events from said sample sequence so that the event types within each candidate combination match the event types in the reference sequence, (b) calculating an overall similarity score for each candidate combination from at least (i) an event occurrence score based on occurrence deviations of the events of a candidate combination with respect to the matching events of the reference sequence and (ii) an attribute match score based on similarity deviations between the data attributes of the events of a candidate combination and the data attributes of the matching events of the reference sequence, and (c) identifying the candidate combination with the best overall similarity score as reference sequence detected.

In preferred embodiments the method of the invention comprises the correlation of the events in the event sequence, the application of a set of similarity techniques for matching the event sequence against the reference sequence and the calculation of a similarity score by weighting and accumulating the results of all applied techniques. In addition, the invention proposes techniques for modelling and constraining the reference sequence to improve and precise similarity discovery.

Preferred scoring techniques included in the method are: A technique for event type matching to discover occurrences of event types in the sequence, either in the sense of full sequence matching or sub-sequence searching, a technique for discovering similarities in event occurrence times, several techniques for comparing event attributes of various data types, techniques for modelling constraints in the reference sequence including event occurrence constraints, event attribute constraints and insertion of arbitrary events, occurrence time ordering constraints and a technique to weight all of the previous techniques' results.

In particular, preferred embodiments of the method comprise calculating the overall similarity score as a weighted sum of at least the event occurrence score and the attribute match score; and/or calculating the event occurrence score from the counts of events lying in the sample sequence between each two events which have been picked into said candidate combination; and/or calculating the event occurrence score from deviations of the actual occurrence times of the events of a candidate combination with respect to expected occurrence times defined in the reference sequence.

Preferably, in order to safe calculation time, the step of calculating the overall similarity score for a specific candidate combination can be terminated when the overall similarity score passes a given threshold during said calculating; and/or attribute match scores can be determined only for those candidate combinations for which the event occurrence scores do not pass a given threshold during the determining of the event occurrence scores.

A further particularly preferred embodiment of the invention comprises the use of a tree graph in calculating the overall similarity scores for the individual candidate combinations. To this end, the events picked from the sample sequence are put as nodes into a tree graph, each candidate combination forming a branch of the tree graph consisting of nodes connected via edges, wherein occurrence deviations are attributed as weights to said edges and similarity deviations as weights to said nodes, and wherein the overall similarity score of a candidate combination is calculated as the total weight accumulated along the branch formed by that candidate combination. Here, the saving of calculation time can be easily implemented by not pursuing the calculation of the overall similarity score for a specific candidate combination further when said overall similarity score passes a given threshold; and/or by determining similarity deviations only for those candidate combinations for which occurrence deviation weights do not exceed a given threshold.

In all embodiments of the invention, constraints can be introduced into the matching steps. Preferably the reference sequence comprises time constraints, and said overall similarity score is calculated additionally from (iii) a time constraint violation score based on time constraint violations of the events of a candidate combination with respect to said time constraints; and/or the reference sequence comprises arrangement constraints, and said overall similarity score is calculated additionally from (iv) an arrangement constraint violation score based on arrangement constraint violations due to the order of events in a candidate combination with respect to said arrangement constraint; and/or event count constraints are set in the reference sequence, and said overall similarity score is calculated additionally from (v) an event count constraint violation score based on event count violations by excessive occurrences of events of a certain event type with respect to said event count constraint.

Further objects, features and benefits of the invention will become apparent from the appended claims and the following detailed description of its preferred embodiments under reference to the enclosed drawings, wherein:

DETAILED DESCRIPTION OF THE PREFERRED EMBODIMENTS

Preferred embodiment of the invention will be disclosed in this section by means of an incremental example structured in the following way:
1. matching of event type occurrence,
2. matching of event occurrence time,
3. matching of event attributes,
4. processing of constraints set in the reference sequence,
5. processing of arbitrary events added to the reference sequence,
6. weighting of similarity factors, and
7. distance calculation and overall similarity assessment.

In the context of the example, an event is a data packet of any format, having an assigned event type and holding a set of attributes. Each attribute is of a given data type and holds a value. The term event sequence refers to a set of correlated events. An apparatus for correlating temporally or semantically related events is used to group single events into correlated event sequences.

Figure 1:
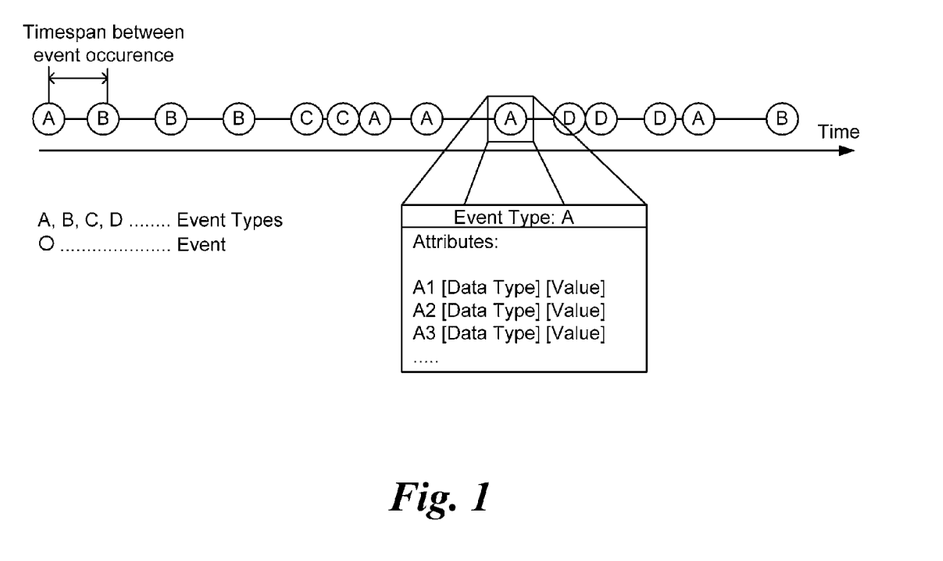
FIGS. 1 and 2 show examples of a sample sequence of events and a reference sequence of events, respectively.

The method compares a sample sequence (searched event sequence) to a reference sequence (search sequence). FIG. 1 illustrates a sample event sequence. The sequence contains a set of events of types A, B, C and D, each holding an arbitrary number of event attributes.

Figure 2:
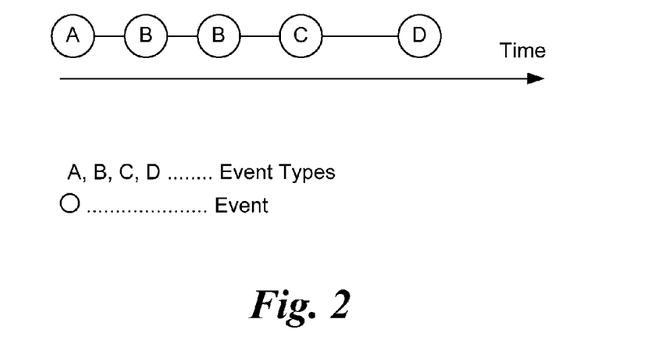

An example of a reference sequence is given in FIG. 2. Event types in the reference sequence are assumed to be the same as in the searched event sequences if they do have the same identifier. It is not required that the numbers of distinct event types in the reference sequence and the searched sequence match.

1. Matching of Event Type Occurrence

Event type occurrence similarity can be determined either in the sense of full event sequence matching or subsequence searching. The matching process is the same in both cases. Yet, deviations at the beginning or end of the sequence are not considered in case of subsequence searching.

Figure 3:
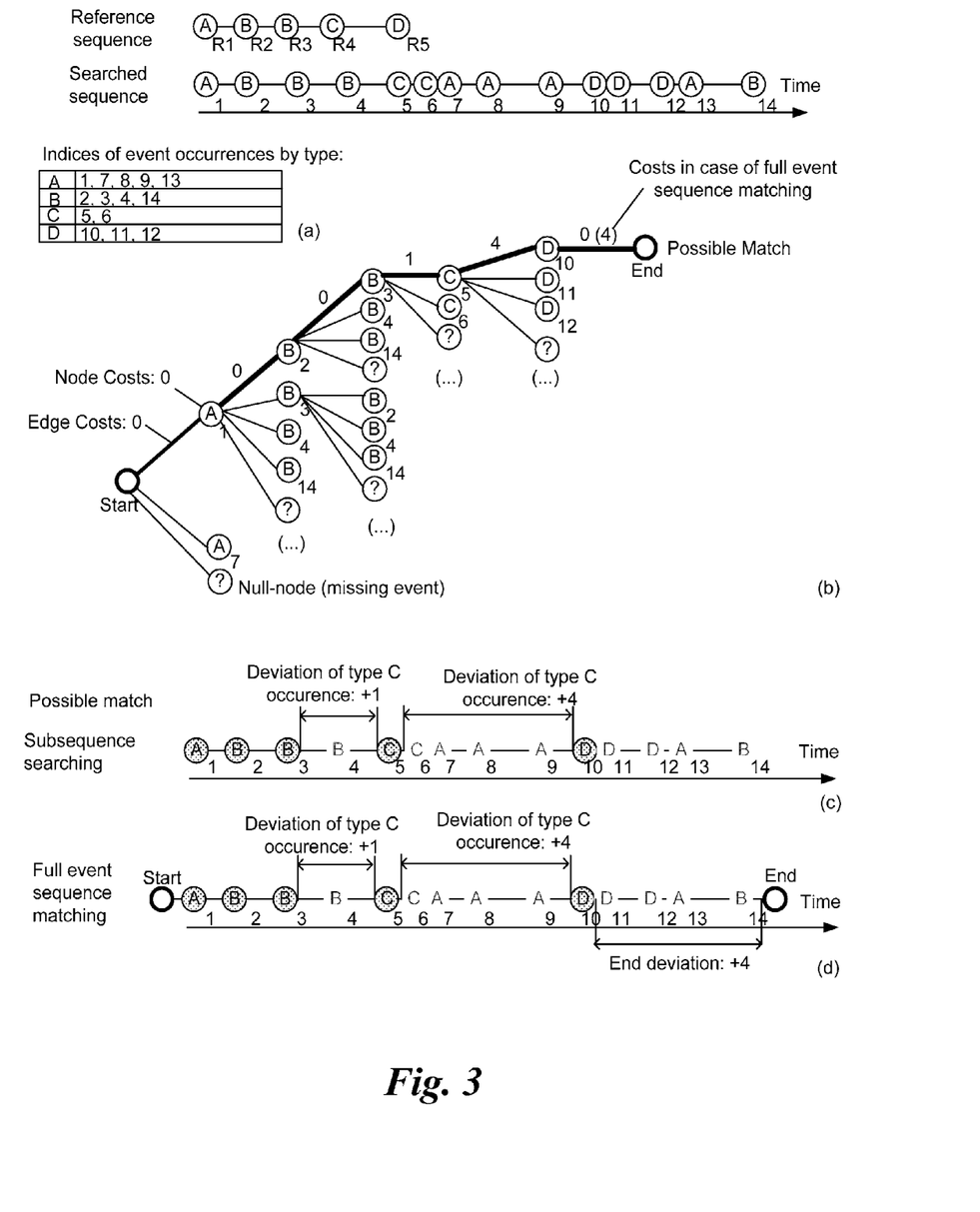
FIG. 3 shows the steps of picking candidate combinations from the sample sequence, putting them into a tree graph, and calculating event occurrence scores as accumulated edge weights of the branches of the tree graph on the basis of counts of intervening events.

The process for event type occurrence matching is illustrated in FIG. 3. First, possible matches of the sequences are discovered by searching for event occurrences of the event types in the reference sequence (FIG. 3a) and forming possible combinations of these event occurrences that match the reference sequence in a tree graph. In FIG. 3b this step is illustrated according to an example of a tree graph that shows a subset of possible matches, also called "candidate combinations", as branches of the tree (only the first branch, i.e. only one of the candidate combinations, is fully depicted in FIGS. 3-5; the other branches, or candidate combinations, respectively, are shown only in part). The method also takes into consideration that certain event types may be missing in the searched sequence by allowing the candidate matches to contain "null-nodes" representing events that would have to be inserted into the searched sequence.

Deviation Assessment for Subsequence Searching

Deviations are assigned between the occurrences of two events by determining the number (count) of events contained in the searched sequence between the two events (FIG. 3c). An arbitrary formula can be used for calculation of the deviation.

Deviation Assessment for Full Event Sequence Matching

In case of full event sequence matching, the occurrence of events between the start node and the first event in the candidate match are considered as deviations as well. In addition, also occurrences of events after the last event of the candidate match are considered as deviations from the reference sequence (FIG. 3d).

Evaluation of candidate combinations (matches) is based on the edge and node costs along their branch in the tree graph. Edge costs result from events occurring in wrong order—below it is described that occurrence time deviations may also be added to the edge costs or the node costs. Attribute similarity deviations also increase node costs. In addition, constraints (see below) can be taken into consideration for cost assessment. An optional threshold level is introduced to stop candidate matching calculation for a certain candidate and continue with the next one if deviations exceed the threshold (or fall under the threshold, respectively, depending on the definition of the scores and threshold).

2. Matching of Event Occurrence Times

Figure 4:
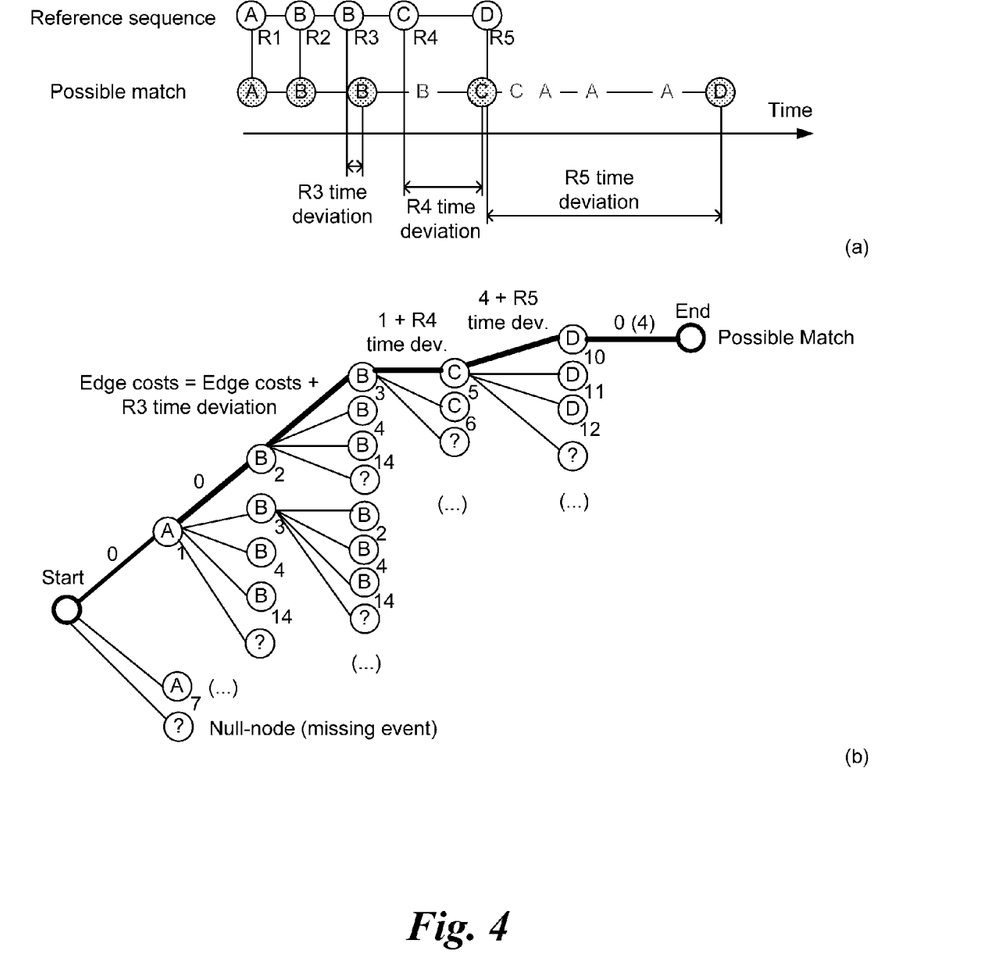
FIG. 4 shows the steps of calculating event occurrence scores as accumulated edge weights of the branches of the tree graph on the basis of both, counts of intervening events and occurrence time deviations.

After or during performing the event type matching, event occurrence times can optionally be taken into consideration for similarity assessment, see FIG. 4.

Sequentially, for each event in the reference sequence and the corresponding event in the candidate combination the occurrence times are compared. Deviations can be assessed based on the absolute values of the occurrence time or relative to a reference value (e.g. total event sequence time-span).

Time deviations can be added to edge or node costs in the candidate combination tree branch (FIG. 4b).

3. Matching of Event Attributes

Event attribute matching means the process by which attribute values of a set of attributes in the reference sequence's events are compared to the corresponding attribute data in the candidate combination's events.

Having discovered a candidate combination, attribute value series in the reference sequence and the candidate combination sequence can be compared by applying one or more of the following techniques:

| Attribute data type | Similarity technique |
| --- | --- |
| Numeric | Euclidian distance similarity |
|  | Normalized sequence similarity |
|  | Normalized relative sequence similarity |
|  | Semantic similarity |
| String | String distance metric similarity |
|  | Semantic similarity |
|  | Lookup table similarity |
| Unknown | Generic similarity implementation |

Figure 5:
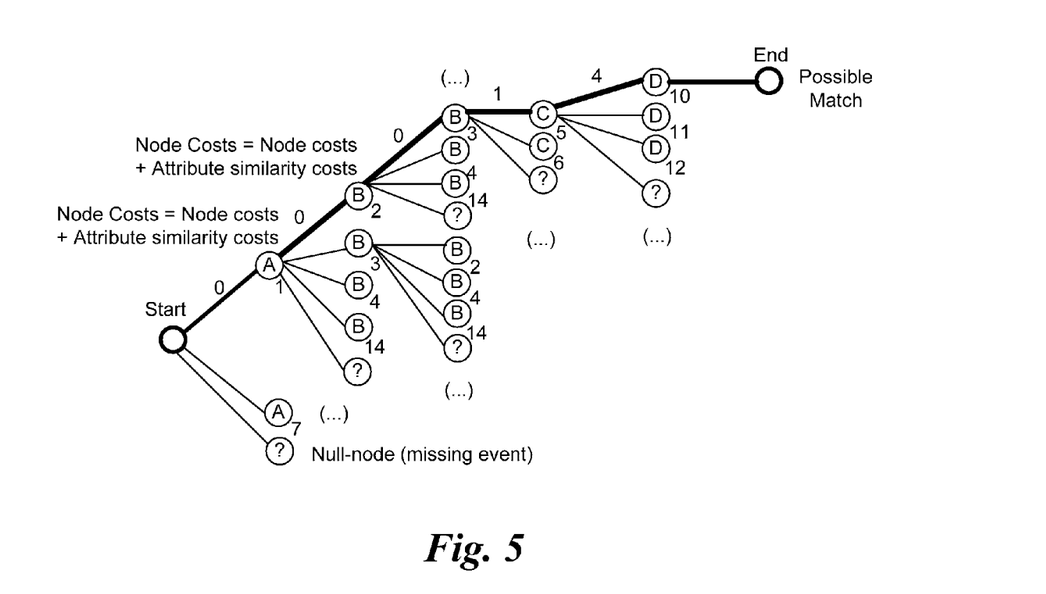
FIG. 5 shows the steps of calculating overall similarity scores for a candidate combination in the tree graph by accumulating the edge weights and node weights, representing event occurrence score and attribute match score, respectively, in the tree graph.

As illustrated in FIG. 5, attribute similarity deviations can be added to node costs in the tree of candidate combinations to assess the overall similarity score of a specific candidate combination.

Euclidian Distance Similarity

The Euclidian distance similarity technique can be applied to numeric event attributes and any kind of date formats. Hereby, a minimum and a maximum reference value are used and similarity is calculated relatively to these values.

Figure 6:
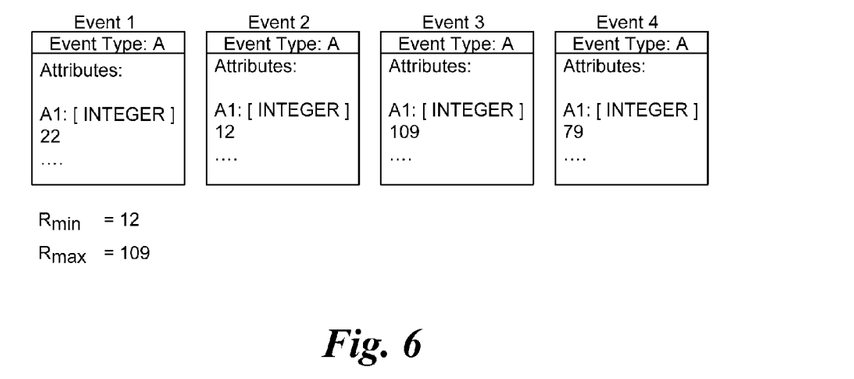
FIGS. 6, 7, 8 and 9 are examples of the use of an Euclidian distance calculation, a normalized sequence similarity calculation, and an attribute value series for normalized relative sequence similarity calculation, respectively, for calculating attribute match scores.
Figure 7:
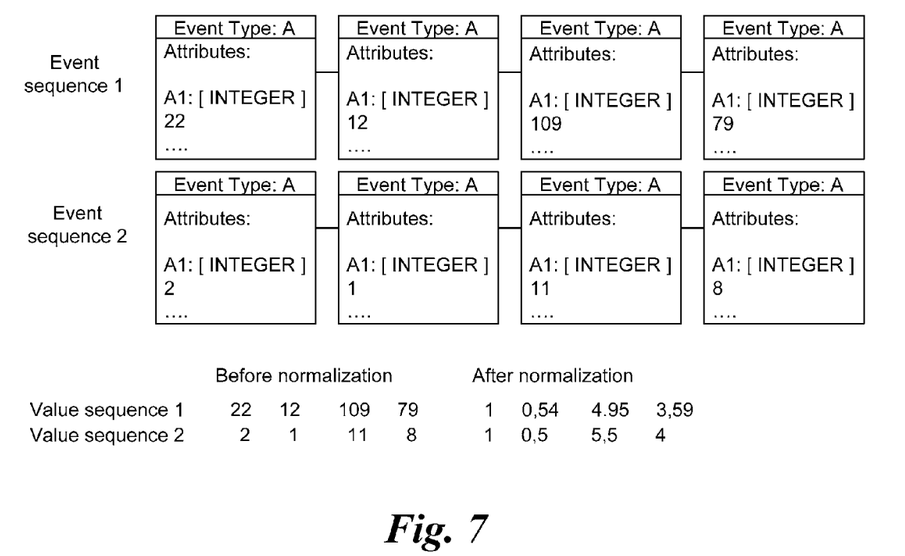

In FIG. 6, four events of the same event type are illustrated, each having the same event attribute A1 of type integer. In the example, the minimum and maximum values among the events are used as reference values. Similarity is then calculated based on the Euclidian distance between two attribute values. For example, similarity of event 1 and event 2 with respect to attribute A1 and similarity technique Euclidian distance is:

$$S(e1, e2, attr) = 1 - (|e1.attr - e2.attr|/(Rmax - Rmin))$$
$$S(Event1, Event2, A1) = 1 - (|22 - 12|/(109 - 12))$$
$$= 1 - 10/97 \approx 0.897$$

with
$S$ ... attribute similarity
$Rmin$ ... reference interval minimum value
$Rmax$ ... reference interval maximum value Normalized Sequence Similarity The normalized sequence similarity technique is used for normalizing attribute values prior to assessing similarity. Normalization is performed relatively to any reference value. For instance, the first value of a sequence of values may be used as a reference. In FIG. 7 two event sequences are given. The sequences of values are shown before and after normalization. The normalized values can then be compared to each other with any similarity matching algorithm.

Normalized Relative Sequence Similarity

The normalized relative sequence similarity technique considers the relative distance between subsequent values in a value series. An example is given in FIG. 8.

Figure 8:
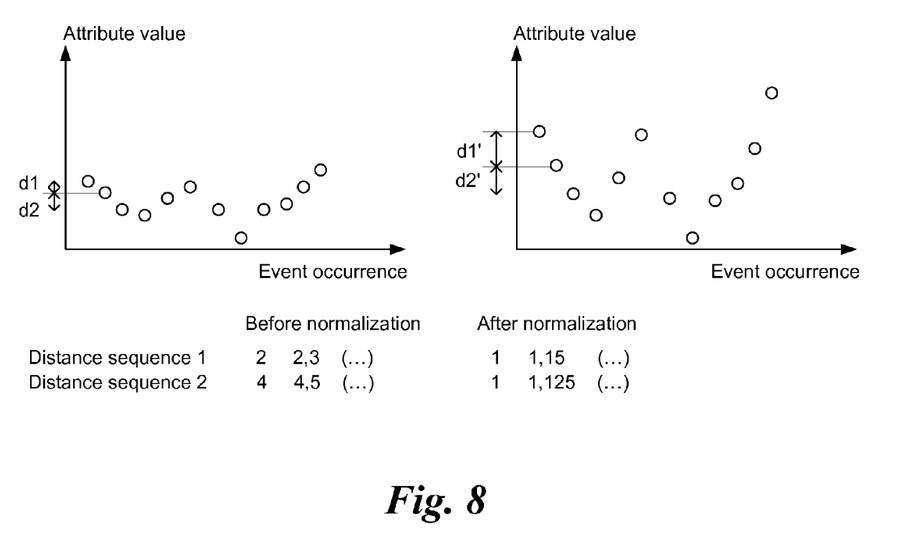

In the example, the normalized sequence similarity technique is applied to the distances between the values instead of applying it to the values itself. In this way, the two value series shown in FIG. 8 are considered as being similar to each other.

Semantic Similarity

Depending on the application domain, any semantic similarity comparer can be provided to assess the similarity between two attributes of arbitrary data type.

String Distance Metric Similarity

For string data attributes, the string distance metric similarity technique utilizes string metrics, a class of textual based metrics resulting in a similarity or dissimilarity score between two pairs of strings for approximate comparison and fuzzy searching. Any kind of string metric can be applied to compare strings for phonetic or literal similarities. Examples of string metrics are Hamming distance, Levensthein distance and Jaro-Winkler string metric.

Lookup Table Similarity

Lookup table similarity is applicable for numeric data attributes and strings. Hereby, a lookup table is provided containing a set of value pairs and a similarity score for each value pair. Similarity is then assessed by looking up the values to be compared in the lookup table.

4. Processing of Constraints Set in the Reference Sequence

In addition to the above described techniques for similarity matching, constraints can be set in the reference sequence. These constraints either limit the tolerance level of a similarity comparison, or can be set to weaken or underweight certain aspects in the comparison process.

Attribute Constraints

Attribute constraints are set for single event attributes in the reference sequence. Constraints can either be blocking, meaning that a violation of a constraint means that the compared sequences are considered as unequal, or a constraint violation can only decrease the similarity score by a certain factor.

Figure 9:
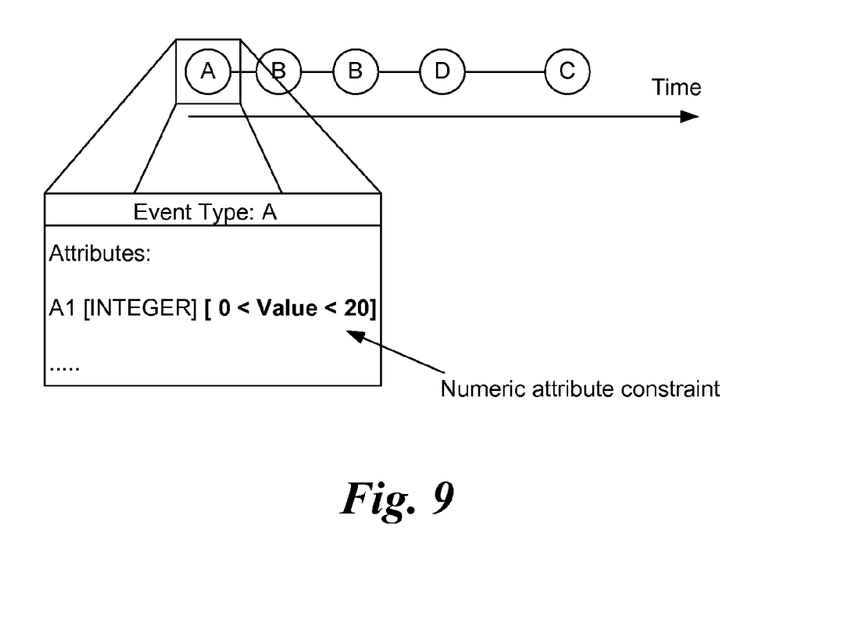

In FIG. 9 an example of a numeric attribute constraint is given. Attribute constraints can be set for numeric values and string attributes, limiting the set of allowed attribute values to a given range or a list of allowed values.

Event Occurrence Constraints

Event occurrence constraints can be set for single events in the reference sequence or for sets of subsequent events.

Figure 10:
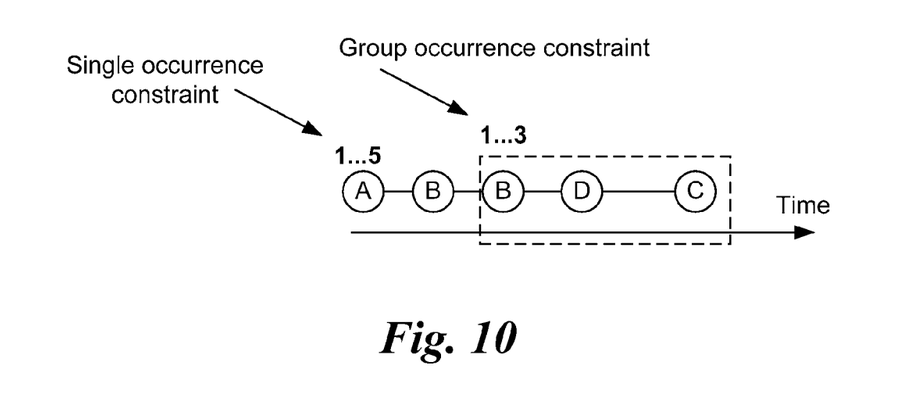
FIGS. 10, 11, 12, and 13 are examples of the use of constraints in the matching steps, i.e. of an event occurrence constraint (FIG. 10), an event order constraint (FIG. 11), an occurrence time constraint (FIG. 12), and the concept of constraint nesting (FIG. 13), respectively.

In FIG. 10 examples of occurrence constraints are provided: A single occurrence constraint ranging from a minimum (min) to a maximum (max) number of occurrences means that at the given position in the reference sequence, between min and max events of the same event type may occur in the searched sequence, otherwise a constraint violation is given. A group occurrence constraint means that between min and max subsequences of events in the group may occur at the given position in the reference sequence. Event occurrence constraints can either be blocking, meaning that a violation of a constraint means that the compared sequences are considered as unequal, or a constraint violation can only decrease the similarity score by a certain factor.

Order Constraints

Figure 11:
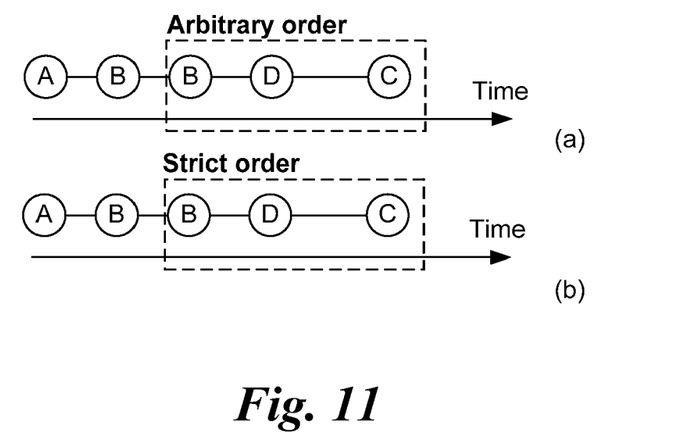

Order constraints can be set for groups of subsequent events. In FIG. 11 two types of order constraints are illustrated: A strict order constraint guarantees that the events within the group occur exactly in the given order. If an arbitrary order block is inserted in the reference sequence, order deviations do not decrease the similarity score.

Occurrence Time Constraints

Figure 12:
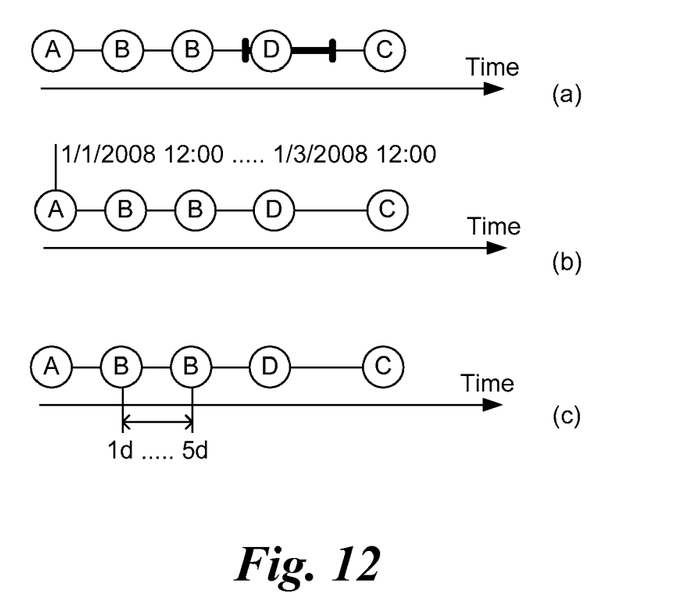

Occurrence time constraints can be set to constrain the relative event occurrence time of single events within an event sequence (FIG. 12a), the absolute occurrence time of single events ((FIG. 12b) or the time span between events in the event sequence (FIG. 12c). All of these constraint types can also be set for groups of events.

Constraint Nesting

Figure 13:
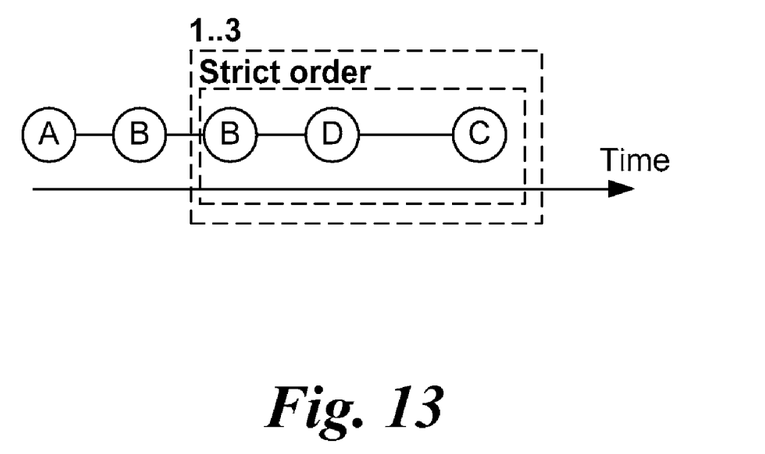

All constraints (attribute constraints, event occurrence constraints and order constraints) can be combined and nested, meaning that for instance a strict order constraint can be nested within an event occurrence constraint. The nesting hierarchy is not limited, see FIG. 13. In addition, constraints can be overlapping.

5. Processing of Wildcard Events in the Reference Sequence

Figure 14:
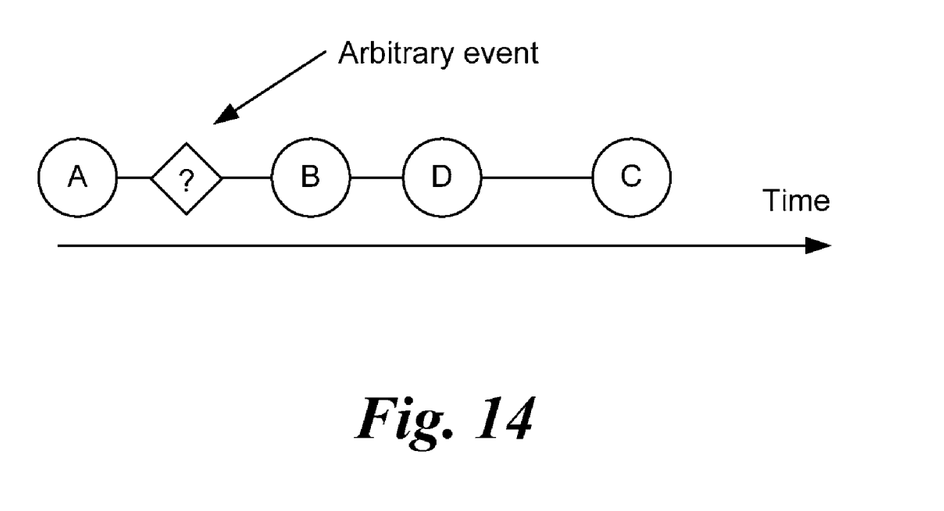
FIG. 14 shows the use of wildcard events in the reference sequence.

In the reference sequence, a set of arbitrary or "wildcard" events can be inserted. Wildcard events mean that in the searched sequence, at this position any event may occur without decreasing the similarity score, see FIG. 14.

Event occurrence constraints and order constraints can be set for wildcard events in the same way as for normal events in the reference sequence.

6. Weighting of Similarity Scores

For sequence matching, all scores which can be considered for the comparison can optionally be weighted by some factor. Weights may be assigned to:
  each event type in order to weight event type occurrence deviations;
  each attribute in order to weight the result of attribute comparisons according to the above listed techniques;
  attribute constraints to weight constraint violations;
  event occurrence constraints to weight violations of single occurrence or group occurrence constraints;
  order constraints;
  occurrence time constraints;
  arbitrary events in order to weight the fact that some arbitrary event occurs in the searched event sequence;
  single events in the reference sequence to weight their occurrence; and
  single attributes of events in the reference sequence to weight their similarity to the corresponding attribute value in a potential match.

7. Overall Similarity Score Assessment

The overall similarity score is then accumulated from one or more of the following similarity scores:
  Event occurrence score, based on intervening event counts (either with full sequence matching or subsequence matching) and/or occurrence time deviations; all optionally weighted by single event occurrence weights and/or event type weights;
  Attribute match score, e.g. in the form of the attribute comparison similarity scores, optionally weighted by overall attribute weights and/or single attribute weights;
  Attribute constraint violation scores, optionally weighted by constraint weights;
  Event occurrence constraint violation scores, optionally weighted by constraint weights;
  Occurrence time constraint violation scores, optionally weighted by constraint weights;
  Order constraint violation scores, optionally weighted by constraint weights;
  Wildcard event insert scores, optionally weighted by wildcard events weights.

In particular, as has been described above, preferred embodiments thus comprise one or more of the following features:
  time constraints in the reference sequence can restrict the occurrence time of a set of events in the sample sequence;
  arrangement constraints in the reference sequence can restrict the order of a set of events or multiple sets of events in the sample sequence;
  arrangement constraints in the reference sequence can weaken the weight of event order deviations for the assessment of the overall similarity score;
  event count constraints in the reference sequence can restrict the number of occurrences of events of a certain event type at one or multiple positions within the sample sequence;
  time constraints in the reference sequence can restrict the time window in which a set of events may occur in the event sequence;
  at arbitrary positions in the reference sequence events of unknown (wildcard) type can be inserted;
  the reference sequence can be searched as a sub-sequence in the sample sequence;
  the applied scoring techniques can be assigned with different weighting factors in the accumulated overall similarity score;
  attributes of the events in the reference sequence can be compared to attributes of the events in the sample sequence using one or more of the following comparison techniques:
    a) comparing numeric and date values to each other;
    b) calculating the distance between string data attributes;
    c) comparing data attributes holding data collections value by value to each other;
    d) comparing events nested in event attributes by comparing their attributes;
  the comparison of numeric and date values can use an arbitrary algorithm;
  the comparison of numeric and date values can be done relative to arbitrary minimum and maximum reference values;
  the distance calculation between string data can be based on an arbitrary algorithm;
  the attributes can be assigned with a weighting factor in the accumulated overall similarity score;
  different similarity techniques can be chosen independently for each attribute of an event;
  the matching of the sample sequence against the reference sequence can use an arbitrary algorithm;
  similarity techniques for matching the sample sequence against the reference sequence can take into account one or more of the following items:
    a) occurrence of events of certain event type;
    b) time of event occurrence and time span between the occurrence of two or more events;
    c) arrangement of events;
    d) attribute values of events;

e) violation or fulfilment of constraints set in the reference pattern as described above;
events can be available in binary format;
events can be available in XML format;
the sample sequence can be represented as a time series of numeric or discrete values at given points in time;
separate time series can exist for one or more series of event attribute values;
the reference sequence detected can be used to forecast future events;
the reference sequence detected can be used to forecast future effects of an event sequence;
the reference sequence detected can be used to forecast future key figures of an event sequence; and/or
the calculated distance between the sample sequence and a reference sequence can be mapped to visual dimensions in a visualization.

The invention is thus not restricted to the specific embodiments and examples disclosed herein but encompasses all variants and modifications thereof falling in the scope and spirit of the appended claims.

What is claimed is:

1. A method of detecting a reference sequence of events in a sample sequence of events, wherein each event is of a certain event type and holds a set of data attributes, the method comprising:
   (a) picking candidate combinations of events from said sample sequence so that the event types within each candidate combination match the event types in the reference sequence;
   (b) calculating an overall similarity score for each candidate combination from at least
      (i) an event occurrence score based on occurrence deviations representing a count of non-matching events between the events of a candidate combination matching events of the reference sequence, and
      (ii) an attribute match score based on similarity deviations between the data attributes of the events of a candidate combination and the data attributes of the matching events of the reference sequence; and
   (c) identifying the candidate combination with the best overall similarity score as reference sequence detected;
   wherein the events of the candidate combinations picked from the sample sequence are put as nodes into a tree graph, each candidate combination forming a branch of the tree graph consisting of nodes connected via edges;
   wherein occurrence deviations are attributed as weights to said edges and similarity deviations as weights to said nodes; and
   wherein the overall similarity score of each candidate combination is calculated as a total weight accumulated along the branch formed by each candidate combination.

2. The method of claim 1, wherein the calculation of the overall similarity score is made as a weighted sum of at least the event occurrence score and the attribute match score.

3. The method of claim 1, wherein the event occurrence score is further calculated from deviations of actual occurrence times of the events of the candidate combination with respect to expected occurrence times defined in the reference sequence.

4. The method of claim 1, wherein calculating the overall similarity score for a specific candidate combination is not pursued further when the overall similarity score passes a given threshold during said calculating.

5. The method of claim 1, wherein attribute match scores are determined only for those candidate combinations for which the event occurrence scores do not pass a given threshold during the determining of the event occurrence scores.

6. The method of claim 1, wherein calculating the overall similarity score for a specific candidate combination is not pursued further when said overall similarity score passes a given threshold.

7. The method of claim 1, wherein similarity deviations are calculated only for those candidate combinations for which occurrence deviation weights do not exceed a given threshold.

8. The method of claim 1, wherein similarity deviations of said data attributes are calculated by comparing numeric or date values relative to each other or relative to given reference values.

9. The method of claim 1, wherein similarity deviations of said data attributes are calculated by comparing distances of string data attributes relative to each other or relative to given reference values.

10. The method of claim 1, wherein the reference sequence comprises time constraints, and wherein said overall similarity score is calculated additionally from
    (iii) a time constraint violation score based on time constraint violations of the events of a candidate combination with respect to said time constraints.

11. The method of claim 9, wherein at least one time constraint is a time window for events to occur in order not to violate said time constraint.

12. The method of claim 1, wherein the reference sequence comprises arrangement constraints, and wherein said overall similarity score is calculated additionally from
    (iv) an arrangement constraint violation score based on arrangement constraint violations due to the order of events in a candidate combination with respect to said arrangement constraint.

13. The method of claim 12, wherein at least one arrangement constraint can weaken the weight of the event occurrence score in the overall similarity score.

14. The method of claim 1, wherein event count constraints are set in the reference sequence, and wherein said overall similarity score is calculated additionally from
    (v) an event count constraint violation score based on event count violations by excessive occurrences of events of a certain event type with respect to said event count constraint.

15. The method of claim 1, wherein the reference sequence comprises a wildcard event which can be matched by any event of a candidate combination.

16. The method of claim 1, wherein the events of the sample sequence are correlated.

17. The method of claim 1, wherein at least some of the events are nested.

* * * * *